United States Patent
Bak et al.

(10) Patent No.: US 11,932,709 B2
(45) Date of Patent: Mar. 19, 2024

(54) DIENE-BASED RUBBER LATEX, METHOD FOR PREPARING THEREOF AND GRAFT COPOLYMER WITH CORE-SHELL STRUCTURE COMPRISING THE SAME

(71) Applicant: LG CHEM, LTD., Seoul (KR)

(72) Inventors: Chang Hong Bak, Daejeon (KR); Young Hwan Jeong, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 771 days.

(21) Appl. No.: 17/051,720

(22) PCT Filed: Dec. 17, 2019

(86) PCT No.: PCT/KR2019/017874
§ 371 (c)(1),
(2) Date: Oct. 29, 2020

(87) PCT Pub. No.: WO2020/130569
PCT Pub. Date: Jun. 25, 2020

(65) Prior Publication Data
US 2021/0238332 A1  Aug. 5, 2021

(30) Foreign Application Priority Data

Dec. 20, 2018 (KR) .................. 10-2018-0166285
Aug. 14, 2019 (KR) .................. 10-2019-0099410

(51) Int. Cl.
| | | |
|---|---|---|
| C08F 236/06 | (2006.01) | |
| C08C 1/065 | (2006.01) | |
| C08C 1/07 | (2006.01) | |
| C08F 6/18 | (2006.01) | |
| C08F 236/04 | (2006.01) | |
| C08F 279/04 | (2006.01) | |
| C08L 9/04 | (2006.01) | |
| C08L 9/08 | (2006.01) | |
| C08L 11/02 | (2006.01) | |

(52) U.S. Cl.
CPC .............. *C08C 1/07* (2013.01); *C08C 1/065* (2013.01); *C08F 6/18* (2013.01); *C08F 236/04* (2013.01); *C08F 236/06* (2013.01); *C08F 279/04* (2013.01); *C08L 9/04* (2013.01); *C08L 9/08* (2013.01); *C08L 11/02* (2013.01)

(58) Field of Classification Search
CPC ... C08C 1/065; C08C 1/07; C08L 9/10; C08F 136/06
See application file for complete search history.

(56) References Cited

U.S. PATENT DOCUMENTS

| | | | |
|---|---|---|---|
| 4,385,157 | A | 5/1983 | Auclair |
| 5,041,498 | A | 8/1991 | Hare |
| 2003/0040555 | A1 | 2/2003 | Sakabe |
| 2012/0034478 | A1 | 2/2012 | Pepers et al. |
| 2017/0226236 | A1 | 8/2017 | Lee |
| 2018/0362750 | A1 | 12/2018 | Lee |
| 2019/0016841 | A1 | 1/2019 | Han et al. |
| 2021/0163736 | A1 | 6/2021 | Chai |

FOREIGN PATENT DOCUMENTS

| | | | |
|---|---|---|---|
| CA | 953838 | A | 8/1974 |
| CA | 2344344 | C * | 10/2008 |
| CN | 1053075 | A | 7/1991 |
| CN | 107075039 | A | 8/2017 |
| CN | 108368189 | A | 8/2018 |
| EP | 1245584 | A1 | 10/2002 |
| EP | 3363819 | A1 | 8/2018 |
| EP | 3363833 | A1 | 8/2018 |
| EP | 3381957 | A1 | 10/2018 |
| JP | H0632961 | A | 2/1994 |
| JP | 11-029618 | * | 2/1999 |
| JP | H1129618 | A | 2/1999 |
| JP | 3455572 | B2 | 10/2003 |
| KR | 19910002472 | B1 | 4/1991 |
| KR | 0199090 | B1 | 6/1999 |
| KR | 2001-0003659 | * | 1/2001 |
| KR | 20010003659 | A | 1/2001 |
| KR | 20090064776 | A | 6/2009 |
| KR | 20170042941 | A | 4/2017 |
| KR | 20170044484 | A | 4/2017 |
| KR | 20180005029 | A | 1/2018 |
| KR | 20180047749 | A | 5/2018 |
| WO | WO2018088677 | A1 | 5/2018 |

OTHER PUBLICATIONS

Machine translation of KR 100585942 B1 (no date).*
Machine translation of JP 11-029618 (no date).*
Machine translation for KR 2017-0042941.*
Extended European Search Report for EP 19901358.2 dated Jul. 30, 2021.
Database WPI Week 201837, Thomson Scientific, London. GB, AN 2018-38148J, 2017.
Database WPI Week 201837, Thomson Scientific, London, GB, AN 2018-386908, 2017.

* cited by examiner

*Primary Examiner* — Marc S Zimmer

(57) ABSTRACT

The present invention relates to a diene-based rubber latex including a polymer aggregate and having an extra large diameter, a method for preparing same and a graft copolymer with a core-shell structure, including same and having excellent impact strength and surface properties. A diene-based rubber latex of which 14 wt % to 26 wt % has diameter of 100 nm to less than 300 nm, 62 wt % to 81 wt % has a diameter of 300 nm to less than 800 nm, and 5 wt % to 14 wt % has a diameter of 800 nm to less than 1000 nm, based on 100 wt % of total rubber particles.

15 Claims, No Drawings

DIENE-BASED RUBBER LATEX, METHOD FOR PREPARING THEREOF AND GRAFT COPOLYMER WITH CORE-SHELL STRUCTURE COMPRISING THE SAME

CROSS-REFERENCE TO RELATED APPLICATIONS

The present application is a National Phase of International Application No. PCT/KR2019/017874, filed on Dec. 17, 2019, which claims the benefit of priority based on Korean Patent Application Nos. 10-2018-0166285, filed on Dec. 20, 2018, and 10-2019-0099410, filed on Aug. 14, 2019, the entire contents of which are incorporated herein by reference.

TECHNICAL FIELD

The present invention relates to a diene-based rubber latex including a polymer aggregate and having an extra large diameter, a method for preparing thereof and a graft copolymer with a core-shell structure, including the same and having excellent impact strength and surface properties.

BACKGROUND ART

Generally, acrylonitrile-butadiene-styrene-based graft resins hereinafter, ABS graft resins) have relatively good physical properties such as impact resistance, mechanical strength, moldability and degree of gloss and are widely used in electrical and electronic components, office machines, automobile parts, etc.

ABS graft resins are generally prepared through an emulsion graft polymerization method, and in order to provide impact strength, a diene-based rubber latex with a large diameter or a diene-based rubber latex with a small diameter is prepared by an emulsion polymerization method, and an aromatic vinyl compound and a vinyl cyan compound are added thereto, followed by graft reacting by an emulsion graft polymerization method to prepare an acrylonitrile-butadiene-styrene-based graft copolymer, and then, mixing a styrene-acrylonitrile copolymer (hereinafter, SAN) with the graft copolymer to finally prepare a thermoplastic ABS-based resin.

However, if the diene-based rubber latex with a large diameter is used, there are limitations in improving gloss, and there are problems in significantly degrading impact strength. If the diene-based rubber latex with a small diameter is used, opposite phenomenon occurs to the large diameter case. In order to improve the limitations, a method of mixing and using diene-based rubber latexes with a large diameter and a small diameter has been suggested, but sufficiently improved effects of both impact strength and gloss were not shown, and there are problems in significantly changing physical properties according to injection conditions.

In order to solve such problems, a method of polymerizing an ABS graft resin using two kinds of diene-based rubber latexes having different average particle diameters and then, mixing a diene-based rubber latex having a greater average particle diameter than the two kinds of the diene-based rubber latexes during extruding the resin, or mixing three kinds of diene-based rubber latexes with different average particle diameters during extruding has been suggested, but this method results in heavy economic and time loss, because each diene-based rubber latex is required to be prepared separately.

In addition, generally, a diene-based rubber latex with a large diameter is prepared using 1) a polymerization method using an acid, a base, etc., 2) a polymerization method by increasing the amount of an inorganic electrolyte or largely decreasing the amount of an emulsifier, 3) a method of preparing a latex and then decreasing the temperature of the latex for aggregation, 4) a method of preparing a latex and then enlarging the latex by mechanical or chemical aggregation, etc., and by such methods, reaction time is very long, a large amount of solid coagulation moiety is produced, and post-process treatment is required for enlarging the latex, thereby decreasing productivity.

Accordingly, a method for improving impact strength and gloss in balance and achieving economic and productive advantages, without degrading other physical properties of an ABS graft resin, is required.

DISCLOSURE OF THE INVENTION

Technical Problem

The present invention is devised to solve the defects of the conventional technique, and an object is to provide a diene-based rubber latex having a small solid coagulate moiety and excellent latex stability.

In addition, another object of the present invention is to provide a method for preparing the diene-based rubber latex using an in situ process.

Also, another object of the present invention is to provide a graft copolymer with a core-shell structure, including the diene-based rubber latex and having excellent impact strength and gloss.

Technical Solution

In order to solve the tasks, the present invention provides a diene-based rubber latex, wherein 14 wt % to 26 wt % has a diameter of 100 nm to less than 300 nm, 62 wt % to 81 wt % has a diameter of 300 nm to less than 800 nm, and 5 wt % to 14 wt % has a diameter of 800 nm to less than 1000 nm, based on 100 wt % of total rubber particles.

In addition, the present invention provides a method for preparing the diene-based rubber latex, including first polymerizing a first conjugated diene-based monomer in the presence of an emulsifier and a fat-soluble polymerization initiator to prepare a first polymerization reactant of a polymerization conversion ratio of 30% to 40% (step a); injecting a water-soluble polymerization initiator to the first polymerization reactant and elevating a temperature to prepare a second polymerization reactant of a polymerization conversion ratio of 60% to 70% (step b); injecting a second conjugated diene-based monomer to the second polymerization reactant and third polymerizing to prepare a third polymerization reactant of a polymerization conversion ratio of 85% to 93% (step c); and injecting a polymer aggregate with an average particle diameter of 230 nm to 300 nm and a water-soluble polymerization initiator to the third polymerization reactant and fourth polymerizing (step d), wherein the first conjugated diene-based monomer and the second conjugated diene-based monomer are used in a weight ratio of 80 to 95:5 to 20, and the polymer aggregate is injected in 0.01 parts by weight to 1.50 parts by weight based on 100 parts by weight of a total amount of the first conjugated diene-based monomer and the second conjugated diene-based monomer.

Also, the present invention provides a graft copolymer with a core-shell structure, including a rubbery polymer core; and a shell wrapping the core and including a unit derived from an aromatic vinyl-based monomer and a unit derived from a vinyl cyan-based monomer, wherein the rubbery polymer core includes from 3 parts by weight to 5 parts by weight of a diene-based rubber latex with an average particle diameter of 600 nm to 800 nm, and from 95 parts by weight to parts by weight of a diene-based rubber latex with an average particle diameter of 310 nm to 330 nm.

Advantageous Effects

The diene-based rubber latex according to the present invention has a small solid coagulate moiety and excellent latex stability, and accordingly may effectively improve the impact strength and gloss of a graft copolymer with a core-shell structure, including the diene-based rubber latex.

The preparation method of the diene-based rubber latex according to the present invention is performed by in situ type and is economic. In addition, by using a polymer aggregate with an average particle diameter of 230 nm to 300 nm, prepared in the presence of a crosslinking agent and by performing multistep polymerization by injecting reactants including a monomer partitively according to a polymerization conversion ratio, a diene-based rubber latex having a small solid coagulate moiety, excellent latex stability and a spherical particle shape may be prepared.

In addition, the graft copolymer with a core-shell structure according to the present invention includes the diene-based rubber latex and may have excellent tensile strength and melt index and improved impact strength and gloss.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words or terms to best explain the invention.

Also, the terms and measurement methods used in the present invention may be defined as follows unless otherwise separately defined.

Terms

The term "rubber latex" used in the present invention is a reaction product obtained by emulsion polymerizing a monomer, and may represent an aqueous medium in which rubber particles are dispersed. For example, a diene-based rubber latex may mean a reaction product obtained by the emulsion polymerization of a monomer including a conjugated diene-based monomer.

The term "rubber" used in the present invention may mean a polymer chain having rubbery elasticity and formed by polymerizing a monomer.

The terms "first conjugated diene-based monomer" and "second conjugated diene-based monomer" used in the present invention represent the same conjugated diene-based monomer, where the "first" and "second" are to distinguish the injection point of the conjugated diene-based monomer.

The term "polymer aggregate" used in the present invention represents an aggregated state by the crosslinking of polymer chains from each other.

The term "roundness" used in the present invention is an index representing the similarity of the shape of particles in the latex to a spherical shape and may be referred to as spheroidicity. The roundness was determined by measuring the length of a major axis which passes the center of a particle and the length of a minor axis which passes the center of a particle and is vertical to the major axis, respectively, for 50 particles in the latex, obtaining the ratio of the length of the major axis to the length of the minor axis (length of major axis/length of minor axis) for each particle, and defining as an average value of the ratio of the length of the major axis to the length of the minor axis. If the value approaches 1, the length of the major axis and the length of the minor axis of each particle close, and as a result, the particle composing the latex closes a spherical shape.

[Measurement Methods]

The "average particle diameter (nm)" and "wt % according to particle diameter" in the present invention were obtained by diluting 1 g of rubber latex in 100 g of distilled water and measuring using a CHDF equipment (Capillary Hydrodynamic Fractionation, Matec Applied Science, Model 1100). Here, the CHDF equipment is an equipment which is capable of measuring particle size and distribution through elution time difference from a column using a capillary column filled with a porous or nonporous filler. A specimen for measurement is injected into the column, elution time is measured, the elution time is compared with a standard value which is obtained by passing monodispersed particles of which particle size is known according to the size through a column, measuring elution time and performing universal calibration, and then, an average particle diameter and particle diameter distribution according to wt % for the total particles in the specimen may be measured.

The "solid coagulate moiety (wt %)" in the present invention represents the ratio of coagulate in a reaction product with respect to 100 wt % of the total weight of the reactant used for reaction and is used as the measure showing the stability of the reaction product. With the decrease of the solid coagulate moiety, the stability of the reaction product is evaluated high. Particularly, the solid coagulate moiety was obtained by filtering a diene-based rubber latex or a graft copolymer with a core-shell structure through a wire mesh with 100 mesh, drying the reaction product on the wire mesh, which was not passed through the wire mesh in a hot air drier at 100° C. for 1 hour, measuring the weight of a coagulate, and calculating by the following Mathematical Formula 2:

Solid coagulate moiety (wt %)=[weight of coagulate (g)/total weight of reactant (g)]×100 [Mathematical Formula 2]

The "polymerization conversion ratio (%)" in the present invention represents the conversion degree of the monomer injected in the reaction into a polymer, and was obtained by collecting 1.5 g of a polymer, drying the polymer in a hot air drier of 150° C. for 15 minutes, measuring the weight of the polymer to obtain the total solid content (TSC), and calculating using thereof by Mathematical Formula 3 below. Here, the polymer represents all materials produced after injecting reaction products in a reactor and initiating reaction, and the components and ratio composing the polymer may be different according to the point of collection.

Polymerization conversion ratio (%)=[total weight of monomer injected (g)/total solid content (g)]× 100  [Mathematical Formula 3]

The "Izod impact strength (kgf·cm/cm)" in the present invention was obtained by manufacturing a specimen with a thickness of ¼" and measuring according to ASTM D256 using an impact strength measurement apparatus (TINIUS OLSEN).

The "gloss" in the present invention was measured according to ASTM D528 using a Gloss meter at an angle of 45°.

The present invention provides a diene-based rubber latex which may be applied to a copolymer of a vinyl cyan-based monomer-conjugated diene-based monomer-aromatic vinyl-based monomer to improve gloss and impact strength without degrading other physical properties such as the mechanical strength and moldability thereof.

The diene-based rubber latex according to an embodiment of the present invention is prepared by a preparation method of an in situ type, which will be explained later, and may be a trimodal rubber latex.

Particularly, the diene-based rubber latex is characterized in that 14 wt % to 26 wt % has a particle diameter of 100 nm to less than 300 nm, 62 wt % to 81 wt % has a particle diameter of 300 nm to less than 800 nm, and 5 wt % to 14 wt % has a particle diameter of 800 nm to less than 1000 nm, based on 100 wt % of the total rubber particles.

In addition, the diene-based rubber latex according to an embodiment of the present invention may have a roundness defined by the following Mathematical Formula 1 of 1.05 to 1.10.

$$\text{Roundness} = \frac{1}{50}\sum_{i=1}^{50} D_i \quad \text{[Mathematical Formula 1]}$$

In Mathematical Formula 1, $D_i$ is a ratio of the length of a major axis with respect to the length of a minor axis [length of major axis/length of minor axis] for an i-th particle in latex.

In addition, the diene-based rubber latex according to an embodiment of the present invention may include a unit derived from an unsaturated carboxylic acid or an ester monomer thereof and a unit derived from a comonomer having a functional group, may be enlarged by a polymer aggregate with an average particle diameter of 230 nm to 300 nm, and may have an average particle diameter of 600 nm to 800 nm.

Generally, in order to impart an acrylonitrile-butadiene-styrene-based graft resin (hereinafter, ABS graft resin) with impact strength, a rubber latex is injected during preparing or molding the resin. However, if a rubber latex with a large diameter is used, impact strength may increase a little, but gloss is rather markedly degraded, and if a rubber latex with a small diameter is used, gloss is improved but there is a problem of decreasing impact strength. If rubber latexes with a large diameter and a small diameter are used together, improving effects of impact strength and gloss are insignificant, and physical properties shown according to molding conditions are changed and there is a problem of having low reproducibility of the physical properties.

However, the diene-based rubber latex according to the present invention is prepared by a preparation method of in situ type, which will be described later, using a polymer aggregate prepared in the presence of a crosslinking agent, a portion of the particles composing the diene-based rubber latex are aggregated with the polymer aggregate and enlarged, and thus, may have a spherical particle shape while having an extra large diameter particle properties with an average particle diameter of 600 nm to 800 nm. Further, the diene-based rubber latex may have trimodal properties of a rubber particle with an extra large diameter, a rubber particle with a large diameter and a rubber particle of a small diameter, and the gloss and impact strength of a resin including the latex, for example, a graft copolymer of a core-shell structure may be effectively improved without adversely affecting other physical properties such as mechanical strength and moldability.

Hereinafter, the diene-based rubber latex according to the present invention will be explained particularly.

In an embodiment of the present invention, the diene-based rubber latex is a reaction product prepared by emulsion polymerizing a monomer including a conjugated diene-based monomer by a preparation method described later, and may be a conjugated diene rubber latex including only a unit derived from a conjugated diene-based monomer, or a rubber latex with two or more component system including a unit derived from a conjugated diene-based monomer and a unit derived from a comonomer.

Particularly, the diene-based rubber latex may include one or more selected from the group consisting of butadiene rubber, isoprene rubber, chloroprene rubber, piperylene rubber, butadiene-styrene rubber and butadiene-acrylonitrile rubber.

In addition, the diene-based rubber latex may have an extra large diameter of which average particle diameter is 600 nm to 800 nm, and in this case, the gloss of a resin including the latex may be markedly improved.

In addition, the diene-based rubber latex may have the average particle diameter and may show trimodal particle properties as described above where 14 wt % to 26 wt % has a particle diameter of 100 nm to less than 300 nm, 62 wt % to 81 wt % has a particle diameter of 300 nm to less than 800 nm, and 5 wt % to 14 wt % has a particle diameter of 800 nm to less than 1000 nm, based on 100 wt % of the total rubber particles, and particularly, and may particularly show trimodal particle properties where 17 wt % to 21 wt % has a particle diameter of 100 nm to less than 300 nm, 68 wt % to 71 wt % has a particle diameter of 300 nm to less than 800 nm, and 8 wt % to 12 wt % has a particle diameter of 800 nm to less than 1000 nm, based on 100 wt % of the total rubber particles. In this case, the gloss and impact strength of the resin including the latex may be improved without affecting the mechanical strength and moldability of the resin.

More particularly, the diene-based rubber latex according to an embodiment of the present invention is prepared by a preparation method of in a situ type, which will be explained later, using a polymer aggregate in the final step of polymerization, and at least a portion of rubber particles composing the diene-based rubber latex is aggregated with the polymer aggregate and enlarged, and thus, the diene-based rubber latex may have the trimodal particle properties and the average particle diameter in the range, and particles may have a uniform spherical shape.

Here, the polymer aggregate enlarges rubber particles in the diene-based rubber latex and has an average particle diameter of 230 nm to 300 nm, and accordingly may easily induce the average particle diameter of the diene-based rubber latex to the extra large diameter.

In addition, since the polymer aggregate is prepared by a preparation method to be described later, i.e., prepared in the presence of a crosslinking agent, a polymer chain in the polymer aggregate may be crosslinked more firmly. Accordingly, the particles of the diene-based latex enlarged from the polymer aggregate may have a spherical particle shape, and the diene-based latex may include a solid coagulate moiety in 0.01 wt % or less, thereby improving the stability of the latex.

In addition, the polymer aggregate may be a polymer including a unit derived from an unsaturated carboxylic acid monomer; or a unit derived from an ester monomer of the unsaturated carboxylic acid, or a copolymer including a unit derived from an unsaturated carboxylic acid monomer and a unit derived from an ester monomer of the unsaturated carboxylic acid; or a copolymer including a unit derived from an unsaturated carboxylic acid or an ester monomer thereof and a unit derived from a comonomer having a functional group. Particularly, the polymer aggregate may be a copolymer including 82 wt % to 92 wt % of a unit derived from an unsaturated carboxylic acid or an ester monomer thereof and 8 wt % to 18 wt % of a unit derived from a comonomer having a functional group. In this case, the enlargement of particles composing a diene-based rubber latex including the polymer aggregate may become easy.

Here, the unsaturated carboxylic acid or an ester monomer thereof may be one or more selected from the group consisting of methyl methacrylate, ethyl methacrylate, butyl methacrylate, methyl acrylate, ethyl acrylate, acrylic acid, methacrylic acid, itaconic acid, maleic acid, fumaric acid, maleic anhydride, monobutyl fumarate, monobutyl maleate and mono-2-hydroxypropyl maleate.

In addition, the comonomer having a functional group may be a copolymerizable material with the unsaturated carboxylic acid or the ester monomer thereof and may include the functional group, and in this case, the functional group may be one or more selected from the group consisting of an amide group, an alcohol group, a carboxylic acid group, a sulfonic acid group, a phosphoric acid group and a boric acid group, and for example, the comonomer may be methacrylamide, acrylamide or a combination thereof.

In addition, the present invention provides a method for preparing the diene-based rubber latex.

The preparation method according to an embodiment of the present invention is characterized in including first polymerizing a first conjugated diene-based monomer in the presence of an emulsifier and a fat-soluble polymerization initiator to prepare a first polymerization reactant of a polymerization conversion ratio of 30% to 40% (step a); injecting a water-soluble polymerization initiator to the first polymerization reactant and elevating a temperature to prepare a second polymerization reactant of a polymerization conversion ratio of 60% to 70% (step b); injecting a second conjugated diene-based monomer to the second polymerization reactant and third polymerizing to prepare a third polymerization reactant of a polymerization conversion ratio of 85% to 93% (step c); and injecting a polymer aggregate with an average particle diameter of 230 nm to 300 nm and a water-soluble polymerization initiator to the third polymerization reactant and fourth polymerizing (step d), wherein the first conjugated diene-based monomer and the second conjugated diene-based monomer are used in a weight ratio of 80 to 95:5 to 20, and the polymer aggregate is injected in 0.01 parts by weight to 1.50 parts by weight based on 100 parts by weight of a total amount of the first conjugated diene-based monomer and the second conjugated diene-based monomer.

The step a is a step for preparing a first polymerization reactant of a polymerization conversion ratio of 30% to 40% by polymerizing a first conjugated diene-based monomer, and may be performed by first polymerizing the first conjugated diene-based monomer in the presence of an emulsifier and a fat-soluble polymerization initiator.

In addition, in the first polymerization, a comonomer which is copolymerizable with the first conjugated diene-based monomer may be polymerized together with the first conjugated diene-based monomer, as necessary, and the comonomer may be, for example, an aromatic vinyl-based monomer, a vinyl cyan-based monomer or a combination thereof. If the comonomer is polymerized at the same time, the comonomer may be used in 20 parts by weight or less based on 100 parts by weight of the total monomer used for the preparation method.

The first conjugated diene-based monomer may be the same as a second conjugated diene-based monomer which will be explained later, and may particularly be one or more selected from the group consisting of 1,3-butadiene, isoprene, chloroprene and piperylene.

In addition, the aromatic vinyl-based monomer may be one or more selected from the group consisting of styrene, α-methylstyrene, α-ethylstyrene, p-methylstyrene, o-methylstyrene, o-tert-butylstyrene, bromostyrene, chlorostyrene, trichlorostyrene and the derivatives thereof, and the vinyl cyan-based monomer may be one or more selected from the group consisting of acrylonitrile, methacrylonitrile, ethacrylonitrile and the derivatives thereof. Here, the derivative may represent a compound with a structure in which one or more hydrogen atoms composing an original compound are substituted with halogen groups, alkyl groups or hydroxyl groups.

The emulsifier is not specifically limited but may be used in 1.0 parts by weight to 5.0 parts by weight, particularly, 1.0 part by weight to 3.0 parts by weight based on 100 parts by weight of the total monomer used in the preparation method.

In addition, the emulsifier is not specifically limited but may use, for example, an anionic absorption type emulsifier such as rosin acid alkali metal salt, saponified fatty acid, sodium lauryl sulfonate and sodium alkylbenzene sulfonate, a nonionic emulsifier such as polyoxyethylene alkyl phenyl ether, a reaction type emulsifier such as dioctyl sodium sulfosuccinate, sodium dodecyl allyl sulfosuccinate, $C_{16-18}$alkenyl succinic acid dipotassium salt and sodium acrylamido stearate, a polymer type reaction type emulsifier such as polyoxyethylene alkyl phenyl ether ammonium sulfate and polyoxyethylene alkyl ether sulfate ester ammonium salt, etc., alone or as a mixture type.

In addition, the fat-soluble polymerization initiator is not specifically limited but may be used in 0.1 parts by weight to 0.5 parts by weight, particularly, 0.1 parts by weight to 0.3 parts by weight based on 100 parts by weight of the total monomer used in the preparation method, and may use one or more selected from the group consisting of cumene hydroperoxide, diisopropyl benzene hydroperoxide, azobisisobutyronitrile, tert-butyl hydroperoxide, paramenthane hydroperoxide and benzoyl peroxide.

In addition, in the first polymerization, an electrolyte, a molecular weight controller and an oxidation-reduction catalyst may be additionally used, as necessary.

The electrolyte is not specifically limited but may be one or more selected from the group consisting of potassium chloride, sodium chloride, potassium bicarbonate, sodium carbonate, potassium carbonate, potassium hydrogensulfite, sodium hydrogensulfite, tetrapotassium pyrophosphate, tetrasodium pyrophosphate, tripotassium phosphate, trisodium phosphate, dipotassium hydrogenphosphate and disodium hydrogenphosphate, and may be used in 0.2 parts by weight to 2 parts by weight based on 100 parts by weight of the total monomer.

The molecular weight controller is not specifically limited but may use commonly well-known kinds such as mercaptans, for example, tert-dodecyl mercaptan, in 0.2 parts by weight to 0.6 parts by weight based on 100 parts by weight of the total monomer.

In addition, the oxidation-reduction catalyst plays the role of an additional polymerization initiator and is not specifically limited. For example, one or more selected from the group consisting of sodium formaldehyde, sulfoxylate, sodium ethylene diamine tetraacetate, ferrous sulfate, dextrose, sodium pyrophosphate and sodium sulfite may be used in 0.001 parts by weight to 0.1 parts by weight based on 100 parts by weight of the total monomer.

The step b is a step for preparing a second polymerization reactant of a polymerization conversion ratio of 60% to 70% by continuously polymerizing the first polymerization reactant and may be performed by injecting a water-soluble polymerization initiator to the first polymerization reactant, elevating the temperature and second polymerizing. Here, the elevating of the temperature may be conducted to a temperature increased by 15° C. to 25° C. with respect to the temperature during the first polymerization, and accordingly, the second polymerization may be performed at a temperature higher by 15° C. to 25° C. with respect to the temperature for the first polymerization.

The water-soluble polymerization initiator is not specifically limited but may be used 0.1 parts by weight to 0.5 parts by weight, particularly, 0.1 parts by weight to 0.3 parts by weight based on 100 parts by weight of the total monomer used in the preparation method, and may use one or more selected from the group consisting of potassium persulfate, sodium persulfate and ammonium persulfate.

The step c is a step for preparing a third polymerization reactant with a polymerization conversion ratio of 85% to 93% from the second polymerization reactant, and may be performed by injecting a second conjugated diene-based monomer to the second polymerization reactant and third polymerizing.

Meanwhile, the preparation method according to an embodiment of the present invention may use the first conjugated diene-based monomer and the second conjugated diene-based monomer in a weight ratio of 80 to 95:5 to 20, particularly, 85 to 90:10 to 15.

In addition, the step d is a step for preparing a diene-based rubber latex from the third polymerization reactant, and may be performed by injecting a polymer aggregate with an average particle diameter of 230 nm to 300 nm and a water-soluble polymer initiator to the third polymerization reactant and fourth polymerizing. In this case, the polymer aggregate may be used in 0.01 parts by weight to 1.50 parts by weight based on 100 parts by weight of the total monomer used for polymerization, i.e., 100 parts by weight of the total amount of the first conjugated diene-based monomer and the second conjugated diene-based monomer. In this case, rubber particles in the diene-based rubber latex may be aggregated with the polymer aggregate in a suitable ratio to be enlarged, and as a result, a diene-based rubber latex having the above-described average particle diameter and trimodal properties may be prepared.

The water-soluble polymerization initiator in the step d is not specifically limited but may be used in 0.05 parts by weight to 0.2 parts by weight based on 100 parts by weight of the total monomer used in the preparation method, and the particular materials thereof are the same as described above.

In addition, the polymer aggregate may be prepared by emulsion polymerization including the following steps:
i) polymerizing 20 parts by weight to 40 parts by weight of an unsaturated carboxylic acid or an ester monomer thereof in the presence of 0.1 parts by weight to 0.2 parts by weight of a crosslinking agent; and
ii) injecting and polymerizing 50 parts by weight to 75 parts by weight of an unsaturated carboxylic acid or an ester monomer thereof and 5 parts by weight to 10 parts by weight of a comonomer having a functional group at a point where a polymerization conversion ratio of the step i) is 85% to 95%.

Meanwhile, the parts by weight of the materials used for preparing the polymer aggregate is based on 100 parts weight of the total amount of the unsaturated carboxylic acid or the ester monomer thereof and the comonomer having a functional group.

The step i) is a step of polymerizing an unsaturated carboxylic acid or the ester monomer thereof for preparing a preliminary polymerization reactant which may play the role of a seed, and may be performed by polymerizing 20 parts by weight to 40 parts by weight of the unsaturated carboxylic acid or the ester monomer thereof in the presence of 0.1 parts by weight to 0.2 parts by weight of a crosslinking agent.

The crosslinking agent introduced into the core part of the aggregate during preparing the polymer aggregate and assists more easy crosslinking between polymer chains composing the polymer aggregate. For example, the crosslinking agent induces stronger bond of a polymer chain formed by an unsaturated carboxylic acid or the ester monomer thereof and may make a bond between a monomer subsequently injected and the polymer chain more easily. That is, a polymer chain in the polymer aggregate may be more firmly crosslinked by the crosslinking agent, and accordingly, the particles of a diene-based latex including the polymer aggregate may have a uniform spherical shape, and latex stability may become excellent. As a result, the gloss of a graft copolymer with a core-shell structure, including the diene-based latex may be improved even more. In addition, the crosslinking agent may use one or more selected from the group consisting of ethylene glycol dimethacrylate, diethylene glycol dimethacrylate, triethylene glycol dimethacrylate, 1,3-butylene glycol dimethacrylate, aryl methacrylate and 1,3-butylene glycol diacrylate.

In addition, the step i) may further use an emulsifier, a polymerization initiator and a molecular weight controller, and the emulsifier may be used in 0.05 parts by weight to 0.06 parts by weight, the polymerization initiator may be used in 0.1 parts by weight to 0.5 parts by weight, and the molecular weight controller may be used in 0.1 to 0.3 parts by weight. In addition, particular materials of the emulsifier and the molecular weight controller are the same as described above, and the polymerization initiator may include the above-described fat-soluble polymerization initiator and water-soluble polymerization initiator, and particularly, may be the same as the water-soluble polymerization initiator.

The step ii) is a step for preparing a polymer aggregate from the preliminary polymerization reactant formed in the step i), and may be performed by injecting 50 parts by weight to 75 parts by weight of an unsaturated carboxylic acid or an ester monomer thereof and 5 parts by weight to 10 parts by weight of a comonomer having a functional Group at a point where a polymerization conversion ratio is 85% to 95% and then polymerizing. Here, the unsaturated carboxylic acid or the ester monomer thereof, and the comonomer having a functional group may be injected separately, or injected after preparing a mixture of the two, and may be injected in batch or continuously for a certain time period.

In addition, the point where the polymerization conversion ratio of the step i) is 85% to 95% may represent a point where the polymerization conversion ratio of the preliminary polymerization reactant is 85% to 95%.

In addition, the step ii) may use an emulsifier and a polymerization initiator, and in this case, the emulsifier may be used in 0.05 parts by weight to 0.06 parts by weight, and the polymerization initiator may be used in 0.5 parts by weight to 2.0 parts by weight, and particular materials are the same as explained in the step i).

In addition, the step i) may be performed in a temperature range of 60° C. to 80° C., and the step ii) may be performed at the same temperature as that of the step i).

The polymer aggregate according to an embodiment of the present invention is prepared by the preparation method in the presence of a crosslinking agent and has an average particle diameter of 230 nm to 300 nm, and at the same time, a polymer chain in the polymer aggregate may be more firmly crosslinked. Accordingly, the rubber particles of a diene-based rubber latex including the polymer aggregate may have an average particle diameter of an extra large diameter and a certain spherical shape, thereby achieving excellent latex stability.

Meanwhile, the step d may further use an emulsifier as necessary, and in this case, the emulsifier may be used in 0.1 parts by weight to 0.5 parts by weight based on 100 parts by weight of the total monomer, and particular materials are the same as described above.

In addition, in the preparation method of the diene-based rubber latex according to the present invention, the first polymerization, third polymerization and fourth polymerization excluding the second polymerization may be performed in suitably controlled temperature conditions according to purpose. For example, the first polymerization, third polymerization and fourth polymerization may be performed in the same or different temperature conditions, and particularly, the third polymerization and fourth polymerization may be performed in increased temperature conditions when compared with the first polymerization. More particularly, the second polymerization may be performed in increased temperature conditions by 15° C. to 25° C. when compared with the first polymerization, and the third polymerization and fourth polymerization may be performed in the same temperature conditions as the second polymerization. In this case, the first polymerization may be performed in temperature conditions of 40° C. to 70° C., and the second polymerization, third polymerization and fourth polymerization may be performed in temperature conditions of 70° C. to 85° C. That is, the second polymerization may be performed in a temperature range of 70° C. to 85° C. and at an elevated temperature by 15° C. to 25° C. when compared with the first polymerization.

In the preparation method according to the present invention, a polymer aggregate prepared in the presence of a crosslinking agent and having an average particle diameter of 230 nm to 300 nm is used, and reactants including a monomer is injected partitively according to a polymerization conversion ratio to perform multistep polymerization, and accordingly, a diene-based rubber latex having a small solid coagulate moiety, excellent latex stability and a uniform particle shape may be prepared.

Also, the present invention provides a graft copolymer with a core-shell structure, including the diene-based rubber latex.

The copolymer according to an embodiment of the present invention is characterized in including a rubbery polymer core; and a shell wrapping the core and including a unit derived from an aromatic vinyl-based monomer and a unit derived from a vinyl cyan-based monomer, wherein the rubbery polymer core includes from 3 parts by weight to 5 parts by weight of a diene-based rubber latex with an average particle diameter from 600 nm to 800 nm, and from 95 parts by weight to 97 parts by weight of a diene-based rubber latex with an average particle diameter from 310 nm to 330 nm.

Particularly, the copolymer may include the core in 40 wt % to 60 wt %; and the shell in 40 wt % to 60 wt %, and the shell may include the unit derived from an aromatic vinyl-based monomer and the unit derived from a vinyl cyan-based monomer in a weight ratio of 3:1 to 2:1. In this case, the impact resistance, mechanical properties and moldability of the copolymer may be even more excellent.

Meanwhile, the copolymer according to an embodiment of the present invention may be prepared by adding a vinyl cyan-based monomer and an aromatic vinyl-based monomer to a rubbery polymer core including the diene-based rubber latex and performing emulsion graft polymerization, and accordingly, the copolymer may include the diene-based rubber latex and may have excellent impact resistance, mechanical properties and moldability together with excellent gloss and impact strength.

Particularly, the copolymer may have a solid coagulate moiety of 0.03 wt % or less.

Hereinafter, the present invention will be explained in more detail referring to Examples and Experimental Examples. However, the Examples and Experimental Examples are only for illustrating the present invention, and the scope of the present invention is not limited thereto.

Preparation of Polymer Aggregate

Preparation Example 1

To a nitrogen-substituted polymerization reactor (autoclave), 62 parts by weight of ion-exchange water, 0.06 parts by weight of dioctyl sodium sulfosuccinate, 30 parts by weight of ethyl acrylate, 1 part by weight of methacrylic acid, 0.15 parts by weight of ethylene Glycol dimethacrylate, 0.15 parts by weight of tert-dodecyl mercaptan (TDDM), and 0.3 parts by weight of potassium persulfate were injected in batch and emulsion polymerized at 70° C. During polymerizing, at a point where a polymerization conversion ratio reached 90%, 62 parts by weight of butyl acrylate, 7 parts by weight of methacrylamide and 0.3 parts by weight of tert-dodecyl mercaptan were mixed and injected in a constant rate for 4 hours, and separately at the same time, 1.3 parts by weight of potassium persulfate, and 0.06 parts by weight of dioctyl sodium sulfosuccinate were injected in a constant rate for 5 hours and emulsion polymerized at 70° C. The polymerization was finished at a point where a polymerization conversion ratio reached 99% or more, and a polymer aggregate having an average particle diameter of 251 nm was prepared.

Preparation Example 2

To a nitrogen-substituted polymerization reactor (autoclave), 62 parts by weight of ion-exchange water, 0.05 parts by weight of dioctyl sodium sulfosuccinate, 30 parts by weight of ethyl acrylate, 1 part by weight of methacrylic acid, 0.15 parts by weight of ethylene glycol dimethacrylate, 0.15 parts by weight of tert-dodecyl mercaptan (TDDM), and 0.3 parts by weight of potassium persulfate were injected in batch and emulsion polymerized at 70° C. During polymerizing, at a point where a polymerization conversion ratio reached 90%, 62 parts by weight of butyl acrylate, 7 parts by weight of methacrylamide and 0.3 parts by weight of tert-dodecyl mercaptan were mixed and injected in a constant rate for 4 hours, and separately at the same time, 1.3 parts by weight of potassium persulfate, and 0.06 parts by weight of dioctyl sodium sulfosuccinate were injected in a constant rate for 5 hours and emulsion polymerized at 70° C. The polymerization was finished at a point where a polymerization conversion ratio reached 99% or more, and a polymer aggregate having an average particle diameter of 280 nm was prepared.

Comparative Preparation Example 1

To a nitrogen-substituted polymerization reactor (autoclave), 62 parts by weight of ion-exchange water, 0.08 parts by weight of dioctyl sodium sulfosuccinate, 30 parts by weight of ethyl acrylate, 1 part by weight of methacrylic acid, 0.15 parts by weight of ethylene glycol dimethacrylate, 0.15 parts by weight of tert-dodecyl mercaptan (TDDM), and 0.3 parts by weight of potassium persulfate were injected in batch and emulsion polymerized at 70° C. During polymerizing, at a point where a polymerization conversion ratio reached 90%, 62 parts by weight of butyl acrylate, 7 parts by weight of methacrylamide and 0.3 parts by weight of tert-dodecyl mercaptan were mixed and injected in a constant rate for 4 hours, and separately at the same time, 1.3 parts by weight of potassium persulfate, and 0.08 parts by weight of dioctyl sodium sulfosuccinate were injected in a constant rate for 5 hours and emulsion polymerized at 70° C. The polymerization was finished at a point where a polymerization conversion ratio reached 99% or more, and a polymer aggregate having an average particle diameter of 211 nm was prepared.

Comparative Preparation Example 2

To a nitrogen-substituted polymerization reactor (autoclave), 62 parts by weight of ion-exchange water, 0.04 parts by weight of dioctyl sodium sulfosuccinate, 30 parts by weight of ethyl acrylate, 1 part by weight of methacrylic acid, 0.15 parts by weight of ethylene glycol dimethacrylate, 0.15 parts by weight of tert-dodecyl mercaptan (IDDM), and 0.3 parts by weight of potassium persulfate were injected in batch and emulsion polymerized at 70° C. During polymerizing, at a point where a polymerization conversion ratio reached 90%, 62 parts by weight of butyl acrylate, 7 parts by weight of methacrylamide and 0.3 parts by weight of tert-dodecyl mercaptan were mixed and injected in a constant rate for 4 hours, and separately at the same time, 1.1 parts by weight of potassium persulfate, and 0.05 parts by weight of dioctyl sodium sulfosuccinate were injected in a constant rate for 5 hours and emulsion polymerized at 70° C. The polymerization was finished at a point where a polymerization conversion ratio reached 99% or more and a polymer aggregate having an average particle diameter of 327 nm was prepared.

Comparative Preparation Example 3

A polymer aggregate having an average particle diameter of 267 nm was prepared by performing the same procedure as in Preparation Example 1 except for not using ethylene glycol dimethacrylate in Preparation Example 1.

Preparation of Polybutadiene Rubber Latex

Example 1

To a nitrogen-substituted reactor (autoclave), based on 100 parts by weight of 1,3-butadiene, 75 parts by weight of ion-exchange water, 90 parts by weight of 1,3-butadiene, 3 parts by weight of saponified fatty acid, 0.1 parts by weight of potassium carbonate, 0.1 parts by weight of tert-dodecyl mercaptan (TDDM), 0.15 parts by weight of tert-butyl hydroperoxide, 0.06 parts by weight of dextrose, 0.005 parts by weight of sodium picolinate and 0.0025 parts by weight of ferrous sulfate were injected in batch and polymerized at 55° C. to prepare a first polymerization reactant of which polymerization conversion ratio was 35%. Then, 0.3 parts by weight of potassium persulfate was injected thereto, the temperature was elevated to 72° C., and polymerization was continued to prepare a second polymerization reactant of which polymerization conversion ratio was 65%. 10 parts by weight of 1,3-butadiene was injected thereto, polymerization was performed until a polymerization conversion ratio reached 90%, and 0.5 parts by weight of the polymer aggregate prepared in Preparation Example 1, 0.1 parts by weight of potassium persulfate and 0.3 parts by weight of saponified fatty acid were injected and reacted. The reaction was finished at a point where a polymerization conversion ratio reached 95% to prepare a polybutadiene rubber latex with an average particle diameter of 763 nm. In this case, total polymerization time consumed was 16 hours.

Example 2

A polybutadiene rubber latex having an average particle diameter of 758 nm was prepared by performing the same procedure as in Example 1 except for injecting 0.5 parts by weight of the polymer aggregate prepared in Preparation Example 2 instead of the polymer aggregate prepared in Preparation Example 1, in Example 1.

Example 3

A polybutadiene rubber latex having an average particle diameter of 751 nm was prepared by performing the same procedure as in Example 1 except for injecting 0.01 parts by weight of the polymer aggregate prepared in Preparation Example 1, in Example 1.

Example 4

A polybutadiene rubber latex having an average particle diameter of 775 nm was prepared by performing the same procedure as in Example 1 except for injecting 1.5 parts by weight of the polymer aggregate prepared in Preparation Example 1, in Example 1.

Comparative Example 1

A polybutadiene rubber latex having an average particle diameter of 480 nm was prepared by performing the same procedure as in Example 1 except for injecting 0.5 parts by weight of the polymer aggregate prepared in Comparative Preparation Example 1 instead of the polymer aggregate prepared in Preparation Example 1, in Example 1.

Comparative Example 2

A polybutadiene rubber latex having an average particle diameter of 998 nm was prepared by performing the same procedure as in Example 1 except for injecting 0.5 parts by weight of the polymer aggregate prepared in Comparative Preparation Example 2 instead of the polymer aggregate prepared in Preparation Example 1, in Example 1.

Comparative Example 3

A polybutadiene rubber latex having an average particle diameter of 270 nm was prepared by performing the same procedure as in Example 1 except for injecting 0.005 parts by weight of the polymer aggregate prepared in Preparation Example 1, in Example 1.

Comparative Example 4

A polybutadiene rubber latex having an average particle diameter of 1101 nm was prepared by performing the same procedure as in Example 1 except for injecting 2.0 parts by weight of the polymer aggregate prepared in Preparation Example 1, in Example 1.

Comparative Example 5

A polybutadiene rubber latex having an average particle diameter of 572 nm was prepared by performing the same procedure as in Example 1 except for injecting 0.5 parts by weight of the polymer aggregate prepared in Comparative Preparation Example 3 instead of the polymer aggregate prepared in Preparation Example 1, in Example 1. In this case, total polymerization time consumed was 16.5 hours.

Comparative Example 6

A polybutadiene rubber latex having an average particle diameter of 994 nm was prepared by performing the same procedure as in Example 1 except for not injecting the potassium persulfate and the saponified fatty acid during injecting the polymer aggregate, in Example 1. In this case, total polymerization time consumed was 18 hours.

Experimental Example 1

The latex stability, solid coagulate moiety content, average particle diameter and particle distribution (weight ratio according to particle diameter), and particle roundness of each of the latexes prepared in Examples 1 to 4 and Comparative Examples 1 to 6 were compared and analyzed, and the results are shown in Table 1 below.

1) Latex Stability (wt %)

To obtain the latex stability, 500 g of each latex was filtered using a 100 mesh net, injected to a homo mixer (product name: T.K. ROBOMICS, manufacturer: T.K. Primix) and stood in 12,000 rpm conditions for 60 minutes. Then, coagulant left on the 100 mesh net was measured and calculation was conducted according to the following Mathematical Formula 4:

Latex stability (wt %)=[weight of coagulate left on 100 mesh net (g)/theoretical total solid content of reactant including monomer used in reaction (g)]×100     [Mathematical Formula 4]

2) Average Particle Diameter (μm) and Particle Diameter Distribution

The average particle diameter and particle diameter distribution (weight ratio according to particle diameter) was obtained by diluting 1 g of latex in 100 g of distilled water and measuring using a CHDF equipment (Capillary Hydrodynamic Fractionation, Matec Applied Science, Model 1100).

3) Solid Coagulate Moiety (wt %)

The latex was filtered using a 100 mesh wire net, a reaction product not passed through the wire net was dried in a hot air drier of 100° C. for 1 hour, and a weight of the coagulate was measured. The solid coagulate moiety was calculated by the following Mathematical Formula 2:

Solid coagulate moiety (wt %)=[weight of coagulate (g)/total weight of reactant (g)]×100  [Mathematical Formula 2]

4) Particle Roundness

The roundness of the latex particle was calculated using the ratios of length of major axis (long diameter)/length of minor axis (short diameter) of particles and as the average value thereof. Each latex was analyzed by TEM (JEM-1400, Jeol), the length of a major axis and the length of a minor axis were measured for 50 particles, and the particle roundness was calculated through the following Mathematical Formula 1:

$$\text{Roundness} = \frac{1}{50}\sum_{i=1}^{50} D_i \qquad \text{[Mathematical Formula 1]}$$

In Mathematical Formula 1, D is a ratio of the length of a major axis with respect to the length of a minor axis [length of major axis/length of minor axis] for an i-th particle in latex.

TABLE 1

| Division | Polymer aggregate average particle diameter (nm) | Latex stability (wt %) | Solid coagulate moiety (wt %) | Particle roundness | Average particle diameter (nm) | Particle diameter distribution (wt %) | | |
|---|---|---|---|---|---|---|---|---|
| | | | | | | 100 ≤ particle diameter (nm) < 300 | 300 ≤ particle diameter (nm) < 800 | 800 ≤ particle diameter (nm) < 1000 |
| Example 1 | 251 | 0.02 | 0.01 | 1.05 | 763 | 19 | 70 | 11 |
| Example 2 | 280 | 0.02 | 0.01 | 1.06 | 758 | 20 | 71 | 5 |
| Example 3 | 251 | 0.01 | 0.01 | 1.05 | 751 | 21 | 71 | 8 |
| Example 4 | 251 | 0.02 | 0.01 | 1.06 | 775 | 17 | 71 | 12 |
| Comparative Example 1 | 211 | 0.02 | 0.01 | 1.06 | 480 | 72 | 28 | |
| Comparative | 327 | 0.07 | 0.1 | 1.08 | 998 | 11 | 44 | 45 |

TABLE 1-continued

| Division | Polymer aggregate average particle diameter (nm) | Latex stability (wt %) | Solid coagulate moiety (wt %) | Particle roundness | Average particle diameter (nm) | Particle diameter distribution (wt %) | | |
|---|---|---|---|---|---|---|---|---|
| | | | | | | 100 ≤ particle diameter (nm) < 300 | 300 ≤ particle diameter (nm) < 800 | 800 ≤ particle diameter (nm) < 1000 |
| Example 2 Comparative Example 3 | 251 | 0.02 | 0.01 | 1.05 | 270 | 82 | — | — |
| Comparative Example 4 | 251 | 0.08 | 0.13 | 1.06 | 1101 | 9 | 35 | 56 |
| Comparative Example 5 | 267 | 0.03 | 0.03 | 1.24 | 572 | 32 | 65 | 3 |
| Comparative Example 6 | 251 | 0.08 | 0.15 | 1.09 | 994 | 12 | 45 | 43 |

As shown in Table 1 above, the polybutadiene rubber latexes of Examples 1 to 4 prepared using 0.01-1.5 parts by weight of the polymer aggregate having an average particle diameter of 230-300 nm based on 100 parts by weight of the total monomer according to the preparation method suggested in the present invention had average particle diameters of 600-800 nm, had particle diameter distribution where 17 wt % to 21 wt % of total rubber particles showed a particle diameter of 100 nm to less than 300 nm, 70 wt % to 71 wt % showed a particle diameter of 300 nm to less than 800 nm and 8 wt % to 12 wt % showed a particle diameter of 800 nm to less than 1000 nm, and had a particle roundness of 1.05-1.06 and a spherical particle shape. In addition, the solid coagulate moiety content was 0.01 wt % or less, and the latex stability was excellent.

On the contrary, the polybutadiene rubber latexes of Comparative Examples to 4 prepared using a polymer aggregate not having an average particle diameter of 230-300 nm, or using a polymer aggregate having an average particle diameter of 230-300 nm but in an amount deviated from 0.01-1.5 parts by weight based on 100 parts by weight of the total monomer, deviated from an average particle diameter of 600-800 nm or could not show trimodal properties suggested in the present invention, thereby deteriorating the latex stability.

Meanwhile, Comparative Examples 5 and 6 used 0.05 parts by weight of a polymer aggregate having an average particle diameter of 230-300 nm based on 100 parts by weight of the total monomer, but Comparative Example 5 deviated from the average particle diameter of 600-800 nm, could not show trimodal properties suggested in the present invention and had a particle roundness of 1.24 and could not have a uniform spherical shape. In addition, Comparative Example 6 deviated from the average particle diameter of 600-800 nm, could not show trimodal properties suggested in the present invention and had increased solid coagulate moiety and markedly decreased latex stability. In this case, the polymer aggregate was prepared without a crosslinking agent in Comparative Example 5, and a water-soluble polymerization initiator was not used while injecting the polymer aggregate in Comparative Example 6. Through the results, it could be confirmed that though enlargement was achieved by a polymer aggregate having an average particle diameter of 230-300 nm, a latex having desired particle properties and excellent stability was not prepared if a crosslinking agent was not used during preparing the polymer aggregate or a water-soluble initiator was not used when applying the polymer aggregate.

The results mean that the diene-based rubber latex having the particle properties (average particle diameter and particle diameter distribution) suggested in the present invention could be obtained by using a polymer aggregate having an average particle diameter in a specific range in a specific amount to be enlarged, and in addition, the particle properties may be accomplished by preparing the polymer aggregate in the presence of a crosslinking agent, and using a water-soluble initiator together during preparing the diene-based latex.

Preparation of Acrylonitrile-Butadiene-Styrene Graft Copolymer with Core-Shell Structure Example 5

To a nitrogen-substituted polymerization reactor (autoclave), 3 parts by weight of the polybutadiene rubber latex prepared in Example 1, 57 parts by weight of a polybutadiene rubber latex having an average particle diameter of 0.3243 μm and 100 parts by weight of ion-exchange water were injected and 70° C. was maintained. A mixture solution composed of 10 parts by weight of acrylonitrile, 25 parts by weight of styrene, 20 parts by weight of ion-exchange water, 0.1 parts by weight of tert-butyl hydroperoxide, 1.0 part by weight of potassium rosinate and 0.3 parts by weight of tert-dodecyl mercaptan, 0.054 parts by weight of dextrose, 0.004 parts by weight of sodium picolinate and 0.0002 parts by weight of ferrous sulfate mixed in a separate mixing apparatus were continuously injected thereto for 3 hours. After finishing the injection, 0.05 parts by weight of dextrose, 0.03 parts by weight of sodium picolinate, 0.001 parts by weight of ferrous sulfate and 0.005 parts by weight of tert-butyl hydroperoxide were injected in batch and reacted while elevating the temperature to 80° C. over 1 hour, and then, the reaction was finished to prepare an acrylonitrile-butadiene-styrene graft copolymer with a core-shell structure of a polymerization conversion ratio of 98%. After that, sulfuric acid was injected, agglomeration, washing and drying processes were performed to prepare an acrylonitrile-butadiene-styrene graft copolymer with a core-shell structure as a powder.

Example 6

An acrylonitrile-butadiene-styrene graft copolymer with a core-shell structure was prepared as a powder by performing the same procedure described in Example 5 except for using the polybutadiene rubber latex prepared in Example 2 instead of the polybutadiene rubber latex prepared in Example 1, in Example 5.

Example 7

An acrylonitrile-butadiene-styrene graft copolymer with a core-shell structure was prepared as a powder by performing the same procedure described in Example 5 except for using the polybutadiene rubber latex prepared in Example instead of the polybutadiene rubber latex prepared in Example 1, in Example 5.

Example 8

An acrylonitrile-butadiene-styrene graft copolymer with a core-shell structure was prepared as a powder by performing the same procedure described in Example 5 except for using the polybutadiene rubber latex prepared in Example 4 instead of the polybutadiene rubber latex prepared in Example 1, in Example 5.

Example 9

An acrylonitrile-butadiene-styrene graft copolymer with a core-shell structure was prepared as a powder by performing the same procedure described in Example 5 except for using the polybutadiene rubber latex prepared in Example 1 in 5 parts by weight and a polybutadiene rubber latex having an average particle diameter of 0.3243 μm in 55 parts by weight, in Example 5.

Comparative Example 7

An acrylonitrile-butadiene-styrene graft copolymer with a core-shell structure was prepared as a powder by performing the same procedure described in Example 5 except for not using the polybutadiene rubber latex prepared in Example 1 and using a polybutadiene rubber latex having an average particle diameter of 0.3243 μm in 60 parts by weight, in Example 5.

Comparative Example 8

An acrylonitrile-butadiene-styrene graft copolymer with a core-shell structure was prepared as a powder by performing the same procedure described in Example 5 except for using the polybutadiene rubber latex prepared in Comparative Example 1 instead of the polybutadiene rubber latex prepared in Example 1, in Example 5.

Comparative Example 9

An acrylonitrile-butadiene-styrene graft copolymer with a core-shell structure was prepared as a powder by performing the same procedure described in Example 5 except for using the polybutadiene rubber latex prepared in Comparative Example 2 instead of the polybutadiene rubber latex prepared in Example 1, in Example 5.

Comparative Example 10

An acrylonitrile-butadiene-styrene graft copolymer with a core-shell structure was prepared as a powder by performing the same procedure described in Example 5 except for using the polybutadiene rubber latex prepared in Comparative Example 3 instead of the polybutadiene rubber latex prepared in Example 1, in Example 5.

Comparative Example 11

An acrylonitrile-butadiene-styrene graft copolymer with a core-shell structure was prepared as a powder by performing the same procedure described in Example 5 except for using the polybutadiene rubber latex prepared in Comparative Example 4 instead of the polybutadiene rubber latex prepared in Example 1, in Example 5.

Comparative Example 12

An acrylonitrile-butadiene-styrene graft copolymer with a core-shell structure was prepared as a powder by performing the same procedure described in Example 5 except for using the polybutadiene rubber latex prepared in Comparative Example 5 instead of the polybutadiene rubber latex prepared in Example 1, in Example 5.

Comparative Example 13

An acrylonitrile-butadiene-styrene graft copolymer with a core-shell structure was prepared as a powder by performing the same procedure described in Example 5 except for using the polybutadiene rubber latex prepared in Comparative Example 6 instead of the polybutadiene rubber latex prepared in Example 1, in Example 5.

Comparative Example 14

An acrylonitrile-butadiene-styrene graft copolymer with a core-shell structure was prepared as a powder by performing the same procedure described in Example 5 except for using the polybutadiene rubber latex prepared in Example 1 in 1 part by weight and a polybutadiene rubber latex having an average particle diameter of 0.3243 μm in 59 parts by weight, in Example 5.

Comparative Example 15

An acrylonitrile-butadiene-styrene graft copolymer with a core-shell structure was prepared as a powder by performing the same procedure described in Example 5 except for using the polybutadiene rubber latex prepared in Example in 7 parts by weight and a polybutadiene rubber latex having an average particle diameter of 0.3243 μm in 53 parts by weight, in Example 5.

Experimental Example 2

The latex stability, solid coagulate moiety, impact strength, melt index, tensile strength and gloss of each of the copolymers prepared in Examples 5 to 9 and Comparative Examples 7 to 15 were compared and analyzed, and the results are shown in Table 2 below.

In this case, 27 parts by Weight of each copolymer powder and 83 parts by weight of SAN (92HR, LG CHEM) Were mixed, extruded and injected to manufacture a specimen with a thickness of ¼", and this specimen was used for measuring impact strength, melt index, tensile strength and gloss.

1) Latex Stability (Minute)

Each copolymer latex was stirred in 15,000 rpm using a homo mixer (T.K. ROBOMICS, T.K. Primix Co.), and time required for coagulating the copolymer latex was measured.

Here, if the time required for the coagulation is 40 minutes or more, the latex stability was assessed excellent.

2) Solid Coagulate Moiety

The copolymer latex was filtered using a 100 mesh wire net, a reaction product not passed through and on the wire net was dried in a hot air drier of 100° C. for 1 hour, and the weight of a coagulate was measured. The solid coagulate moiety was calculated by the following Mathematical Formula 2:

Solid coagulate moiety (wt %)=[weight of coagulate (g)/total weight of reactant (g)]×100 [Mathematical Formula 2]

3) Measurement of Impact Strength

Measurement was conducted using the specimen and an impact strength measuring instrument (TINIUS OLSEN) according to ASTM D256.

4) Melt Index (MI, g/10 min)

Measurement was conducted using the specimen under conditions of 220° C., 10 kg according to ASTM D1238.

5) Tensile Strength (kgf/cm$^2$)

Measurement was conducted using the specimen according to ASTM D638.

6) Gloss

Measurement was conducted using the specimen by means of a gloss meter at 45° according to ASTM D528. It means that the gloss becomes better with the increase of the value.

TABLE 2

| Division | Latex stability (min) | Solid coagulate moiety (wt %) | Impact strength (kdf · cm/cm) | Melt index (10 g/min) | Tensile strength (kgf/cm$^2$) | Gloss |
|---|---|---|---|---|---|---|
| Example 5 | 46 | 0.03 | 34.5 | 48.5 | 435 | 98.4 |
| Example 6 | 45 | 0.03 | 34.2 | 48.4 | 437 | 98.5 |
| Example 7 | 46 | 0.03 | 34.3 | 48.5 | 436 | 98.3 |
| Example 8 | 46 | 0.03 | 34.1 | 48.3 | 439 | 98.4 |
| Example 9 | 45 | 0.03 | 35.4 | 47.4 | 431 | 98.5 |
| Comparative Example 7 | 46 | 0.03 | 31.8 | 48.1 | 441 | 96.1 |
| Comparative Example 8 | 44 | 0.03 | 32.7 | 48.3 | 440 | 95.7 |
| Comparative Example 9 | 38 | 0.07 | 32.3 | 48.6 | 441 | 95.1 |
| Comparative Example 10 | 46 | 0.03 | 31.7 | 48.3 | 442 | 95.9 |
| Comparative Example 11 | 37 | 0.08 | 31.9 | 48.6 | 442 | 95.2 |
| Comparative Example 12 | 36 | 0.10 | 34.2 | 48.2 | 437 | 94.2 |
| Comparative Example 13 | 35 | 0.10 | 31.8 | 48.3 | 440 | 95.8 |
| Comparative Example 14 | 46 | 0.03 | 32.0 | 48.1 | 440 | 96.1 |
| Comparative Example 15 | 44 | 0.04 | 33.4 | 48.1 | 437 | 94.1 |

As shown in Table 2 above, Example 5 to Example 9 according to the present invention showed the solid coagulate moiety of 0.03% or less and excellent latex stability, and showed equivalent or better melt index and tensile strength with improved surface properties, particularly, markedly improved impact strength when compared with the Comparative Examples.

The invention claimed is:

1. A diene-based rubber latex, wherein 14 wt % to 26 wt % of rubber particles in the latex have a diameter of 100 nm to less than 300 nm, 62 wt % to 81 wt % of the rubber particles have a diameter of 300 nm to less than 800 nm, and 5 wt % to 14 wt % of the rubber particles have a diameter of 800 nm to less than 1000 nm, based on 100 wt % of total rubber particles.

2. The diene-based rubber latex of claim 1, wherein a roundness of the rubber particles as defined by the following Mathematical Formula 1 is from 1.05 to 1.10:

$$\text{Roundness} = \frac{1}{50}\sum_{i=1}^{50} D_i \quad \text{[Mathematical Formula 1]}$$

in Mathematical Formula 1, $D_i$ is a ratio of a length of a major axis with respect to a length of a minor axis [length of major axis/length of minor axis] for an i-th particle in latex.

3. The diene-based rubber latex of claim 1, wherein the diene-based rubber latex is enlarged by a polymer aggregate with an average particle diameter of 230 nm to 300 nm, the polymer aggregate comprising a unit derived from an unsaturated carboxylic acid or an ester monomer thereof and a unit derived from a comonomer having a functional group.

4. The diene-based rubber latex of claim 3, wherein the polymer aggregate comprises 85 wt % to 92 wt % of the unit derived from an unsaturated carboxylic acid or an ester monomer thereof and 8 wt % to 15 wt % of the unit derived from a comonomer having a functional group.

5. The diene-based rubber latex of claim 3, wherein the unsaturated carboxylic acid or the ester monomer thereof is one or more selected from the group consisting of methyl methacrylate, ethyl methacrylate, butyl methacrylate, methyl acrylate, ethyl acrylate, acrylic acid, methacrylic acid, itaconic acid, maleic acid, fumaric acid, maleic anhydride, monobutyl fumarate, monobutyl maleate and mono-2-hydroxypropyl maleate.

6. The diene-based rubber latex of claim 3, wherein the comonomer having a functional group is methacrylamide, acrylamide or a combination thereof.

7. The diene-based rubber latex of claim 1, wherein the diene-based rubber latex comprises a solid coagulate moiety of 0.01 wt % or less.

8. A method for preparing the diene-based rubber latex of claim 1, the method comprising:
a) polymerizing a first conjugated diene-based monomer in the presence of an emulsifier and a fat-soluble polymerization initiator to prepare a first polymerization product of a polymerization conversion ratio of 30% to 40%;
b) injecting a water-soluble polymerization initiator into the first polymerization product and elevating a temperature to prepare a second polymerization product of a polymerization conversion ratio of 60% to 70%;
c) injecting a second conjugated diene-based monomer into the second polymerization product and polymerizing to prepare a third polymerization product of a polymerization conversion ratio of 85% to 93%; and
d) injecting a polymer aggregate with an average particle diameter of 230 nm to 300 nm and a water-soluble polymerization initiator into the third polymerization product and polymerizing,
wherein the first conjugated diene-based monomer and the second conjugated diene-based monomer are used in a weight ratio of 80 to 95:5 to 20, and
the polymer aggregate is injected in 0.01 parts by weight to 1.50 parts by weight based on 100 parts by weight of a total amount of the first conjugated diene-based monomer and the second conjugated diene-based monomer.

9. The method for preparing the diene-based rubber latex of claim 8, wherein the polymer aggregate is prepared by emulsion polymerization comprising:
  i) polymerizing 20 to 40 parts by weight of an unsaturated carboxylic acid or an ester monomer thereof in the presence of 0.1 to 0.2 parts by weight of a crosslinking agent; and
  ii) injecting and polymerizing 50 to 75 parts by weight of the unsaturated carboxylic acid or the ester monomer thereof and 5 parts by weight to 10 parts by weight of the comonomer having a functional group at a point where a polymerization conversion ratio of the step i) is 85 to 95%, based on 100 parts by weight of a total amount of the unsaturated carboxylic acid or the ester monomer thereof and the comonomer having a functional group.

10. The method for preparing the diene-based rubber latex of claim 9, wherein the crosslinking agent is one or more selected from the group consisting of ethylene glycol dimethacrylate, diethylene glycol dimethacrylate, triethylene glycol dimethacrylate, 1,3-butylene glycol dimethacrylate, aryl methacrylate and 1,3-butylene glycol diacrylate.

11. The method for preparing the diene-based rubber latex of claim 8, wherein the elevating of the temperature in the step b) is to a temperature increased by 15° C. to 25° C. with respect to a temperature during the first polymerization.

12. The method for preparing the diene-based rubber latex of claim 8, wherein the first conjugated diene-based monomer and the second conjugated diene-based monomer are one or more selected from the group consisting of 1,3-butadiene, isoprene, chloroprene and piperylene.

13. A graft copolymer with a core-shell structure, the graft copolymer comprising:
  a rubbery polymer core;
  and a shell wrapping the core and comprising a unit derived from an aromatic vinyl-based monomer and a unit derived from a vinyl cyan-based monomer,
  wherein the rubbery polymer core comprises
    from 3 parts by weight to 5 parts by weight of the diene-based rubber latex of claim 1, wherein the diene-based rubber latex of claim 1 has an average diameter of 600 nm to 800 nm,
    and from 95 parts by weight to 97 parts by weight of a diene-based rubber latex with an average diameter of 310 nm to 330 nm based on 100 parts by weight of the core.

14. The graft copolymer with a core-shell structure of claim 13, wherein the copolymer comprises 40 wt % to 60 wt % of the core; and 40 wt % to 60 wt % of the shell, and the shell comprises the unit derived from an aromatic vinyl-based monomer and the unit derived from a vinyl cyan-based monomer in a weight ratio of 3:1 to 2:1.

15. The graft copolymer with a core-shell structure of claim 13, wherein the copolymer has a solid coagulate moiety content of 0.03 wt % or less.

* * * * *